Feb. 7, 1933.                H. MONTGOMERY                1,896,967
           MANUFACTURE OF INLAID LINOLEUM AND THE LIKE
                    Filed Oct. 9, 1931          6 Sheets-Sheet 1

Harry Montgomery
        Inventor
By Shear Donaldson & Hall
              attorneys Feb. 7, 1933.  H. MONTGOMERY  1,896,967
MANUFACTURE OF INLAID LINOLEUM AND THE LIKE
Filed Oct. 9, 1931  6 Sheets-Sheet 2

Harry Montgomery
Inventor
By Spear Donaldson & Hall
attorneys

Feb. 7, 1933.  H. MONTGOMERY  1,896,967
MANUFACTURE OF INLAID LINOLEUM AND THE LIKE
Filed Oct. 9, 1931  6 Sheets-Sheet 3

Feb. 7, 1933.  H. MONTGOMERY  1,896,967
MANUFACTURE OF INLAID LINOLEUM AND THE LIKE
Filed Oct. 9, 1931  6 Sheets-Sheet 4

Harry Montgomery
Inventor
By Spear Donaldson & Hall
Attorneys

Feb. 7, 1933. H. MONTGOMERY 1,896,967
MANUFACTURE OF INLAID LINOLEUM AND THE LIKE
Filed Oct. 9, 1931 6 Sheets-Sheet 6

Harry Montgomery
Inventor
By Spear Donaldson & Hall
attorneys

Patented Feb. 7, 1933

1,896,967

UNITED STATES PATENT OFFICE

HARRY MONTGOMERY, OF LONDON, ENGLAND, ASSIGNOR TO THE GREENWICH INLAID LINOLEUM (FREDERICK WALTON'S NEW PATENTS) COMPANY LIMITED, OF LONDON, ENGLAND, A BRITISH COMPANY

MANUFACTURE OF INLAID LINOLEUM AND THE LIKE

Application filed October 9, 1931, Serial No. 567,925, and in Great Britain February 12, 1931.

This invention relates to the manufacture of inlaid linoleum and other inlaid fabrics for which material similar to linoleum material is or may be employed, and especially to that method of manufacture known as the cut or straight line method when carried out by machinery by which pieces of the material are cut by rotary means (such as a rotary cylinder or roll having knives on its circumferential part) the cutting of the pieces and their assembly in proper position to form the pattern taking place in a continuous manner.

It is sometimes required to produce a pattern in which some or all of the pieces inlaid have a veined or grained appearance such as to imitate wood or marble or veined tiles or to give a moiré or jaspé effect. All such effects are hereinafter referred to as graining. It is hardly feasible, however, to produce the graining in the sheets of material to be cut otherwise than in a direction substantially longitudinal, that is, parallel to the side edges of the sheet, in consequence of the graining being effected in the making of the sheets and taking a direction substantially in the direction of the consolidation of the sheet by the rolls as it is being made. Consequently, whatever be the size and shape of the cut pieces or pattern elements, or tesseræ, which in this art are known by the technical word "tessels" and are hereinafter so denominated, and the arrangement of their assembly or inlay, the graining effect would ordinarily be substantially longitudinal to the edges of the inlaid sheet, with the consequence that a proper imitation of parquetry or of a floor of veined tiles or pieces of marble or other veined effect or the like could not be produced by such machinery, because in all such and similar cases the direction of the graining in some of the tessels should be different from that in others, and in some cases, such as imitation herring-bone parquetry, none of the tessels should have their graining in a direction parallel to the side edges of the inlaid sheet. The main object of the present invention is to provide in a simple manner for the turning in an appropriate way of those tessels which are of material in which the graining is not in the direction which it is desired that the grained tessels cut from it shall have when inlaid.

According to the invention those of the cut tessels to be turned are transferred from the rotary cutting means to devices provided in the machine which turn the tessels in such manner as to turn the direction of their graining to the appropriate degree, from which devices the turned tessels are transferred to and disposed on the assembling or inlaying surface in their turned positions and correct situations as components of the pattern. The turning devices preferably consist of plates or discs each capable of accommodating on its surface a tessel or tessels, either flatwise or curved, the said tessel or tessels being such as are required to be turned, and in the operation of the machine the said devices are caused to travel at the same surface speed as the rotary cutting means, each tessel or tessels to be turned being transferred from the knives that have cut it or them to one of the plates or discs. During the travel of the turning devices after receiving the tessels to be turned, they are in the operation of the machine turned with the tessels on them, and in the continuance of their travel the turned tessels are caused to leave the devices and are disposed in proper position for the pattern, on the travelling surface (hereinafter referred to as the assembly surface) on which the tessels are assembled to form the pattern and which is usually the travelling backing fabric or an intermediate surface from which the assembled tessels pass onto the backing. Finally the whole is consolidated by heat and pressure as is well understood.

In order that the said invention may be clearly understood and readily carried into effect, the same will now be more fully described with reference to the accompanying drawings illustrating examples of means for carrying out this invention.

Referring to the apparatus illustrated in Figures 1 to 10, the sheet of material 31 coming from the calender rollers (not shown) is passed around the cutting roll or platen 32 and between the said cutting roll and the knife cylinder 33 which is provided with the usual adjuncts, viz:—stubbing brush 34, plush roll 35, lubricating roll 36, inlaying roll 37, waste roll 38, waste brush 39 and waste conveyor 40, all these parts being of known character and function and not needing any particular description in connection with the present invention. The large pin band drum 41, of which only a portion is shown in the drawings, and which constitutes in this example the assembly surface, is also well known. A turning cylinder 42 is interposed between the knife cylinder 33 and the drum 41 to effect the turning of the tessels before they are deposited on the surface of the said drum. A wheel 43 (Figure 2) on the shaft of the drum 41 drives through spur wheels 44, 45 and 46 a spur wheel 47 on a sleeve or hollow journal 50 on the turning cylinder 42. A spur wheel 48 on the knife cylinder 33 is driven by a spur wheel 49 on the sleeve 50 and the knife cylinder drives by friction the cutting roll 32.

On the surface of the cylinder 42 are a number of plates or discs 51 each adapted to receive from the knife cylinder 33 one or more tessels which are retained on the said disc 51 by means of staple pins 52 (Figures 4 and 5) projecting from the surface of the disc, and after being turned by the partial rotation of the disc are transferred to the assembly surface, that is, to the pin band drum 41. Except perhaps in the case of tessels having comparatively small width (say about 1 inch to 2½ inches) in the direction of action of the machine, the plates or discs 51 should be of curved form at the part where they receive the tessels if they are travelling in a curved path of comparatively small radius at that part, and the same is true in regard to the removal of the tessels from the turning devices, and the curve of each plate or disc should be concentric with the curve of its movement. Each disc 51 may be made of rubber and strengthened by a very thin steel backing plate 53 (Figure 3) which may be, say one hundredth of an inch thick, that is, a quarter of a millimetre. This plate, on which rest the backs of the pins 52 projecting through the rubber, prevents friction between the rubber and a brass backing plate 54 secured to the cylinder 42 and forming a track on which the disc can rotate about the centre of the brass plate, the disc changing its shape as it rotates so that it is always bent in the running direction into a curve parallel with that of the brass plate, or concentric with the cylinder, but is straight in a direction at right angles to its arc of travel, that is, in a longitudinal direction relatively to the cylinder; therefore the rubber is stretched so that the diameter of its surface on the straight line is equal to its length on the curve, in order to avoid distortion of the tessel when inlaying, which might occur if the rubber were stretched along the curve. The brass backing plate 54 is preferably made in two laminations, for convenience in providing undercut grooves as hereinafter described, the inner lamination being indicated at 55. The rubber disc 51 is secured to the thin steel backing plate 53 by short screws 56 which do not enter the brass backing plate 54, the rubber being further secured by a flange or washer 57 surmounting the central spindle 58 of the disc. A number of screws 60 secured by nuts 61 sunk in recesses in the rubber disc 51 are provided with heads 62 to travel in circular grooves 63 in the inner lamination 55 of the brass backing plate, a shouldered portion 64 of each screw travelling in narrower grooves 65 (Figure 6) of the outer lamination 54 of the brass backing plate, the grooves 63 and 65 together constituting in effect an undercut groove as before mentioned, the purpose of these screws 60 being to keep the turning device concentric with the cylinder 42.

Figure 1:
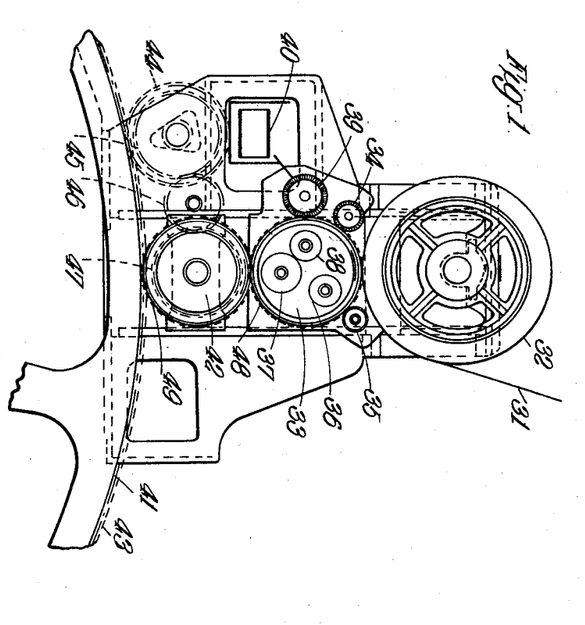
Figure 1 represents in side elevation a portion of a linoleum machine to which the invention is applied.
Figure 2:
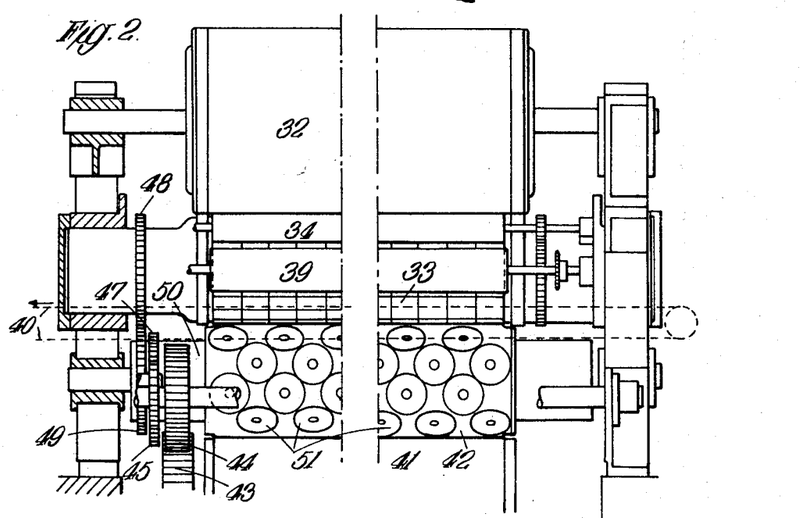
Figure 2 is a front elevation of the said portion of the machine, partly in section.
Figure 3:
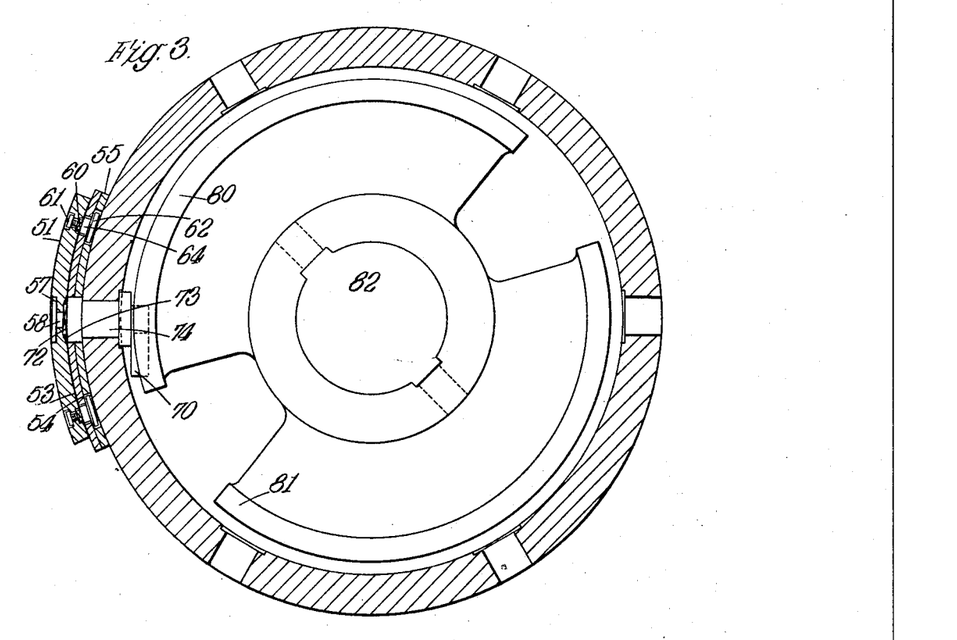
Figure 3 is an end section of the turning cylinder.
Figure 4:
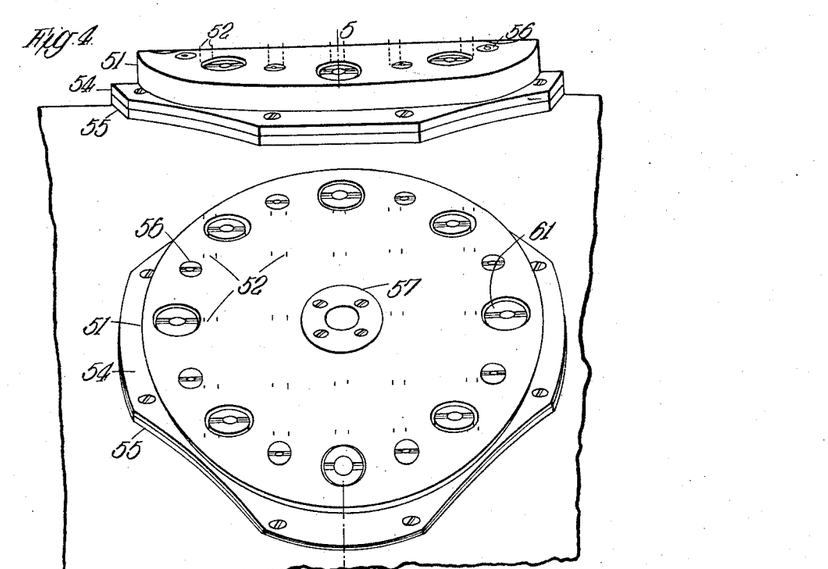
Figure 4 represents a portion of the surface of the said cylinder.
Figure 5:
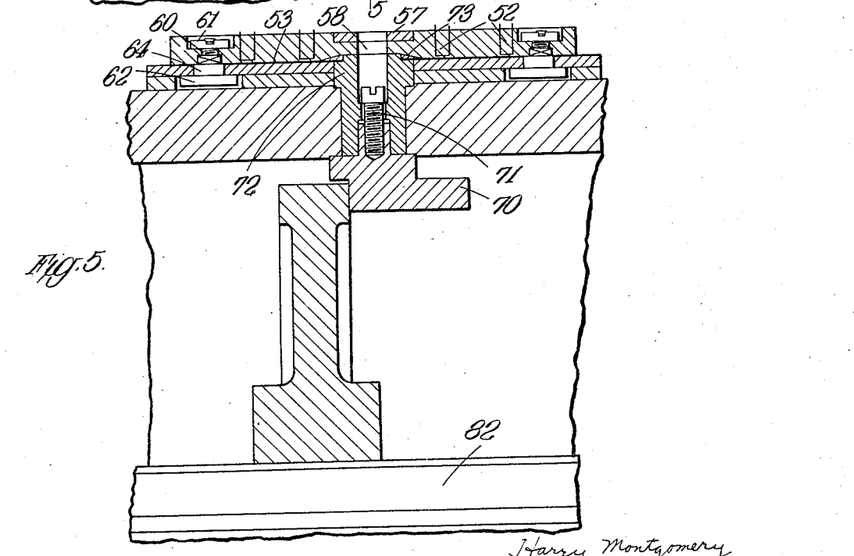
Figure 5 is a sectional view taken on the line 5—5 in Figure 4.
Figure 6:
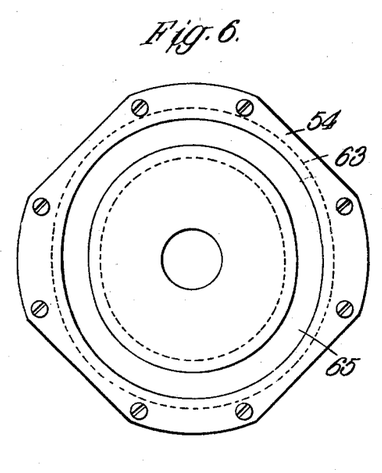
Figure 6 is a plan of the base plate of a turning device.
Figure 7:
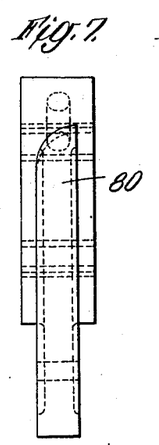
Figure 7 is a detail illustrating the cam guide in elevation at a right angle to the view in Figure 3.
Figure 8:
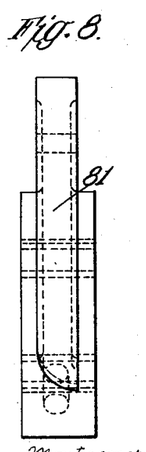
Figure 8 is a similar detail view of the reversing cam guide seen in Figure 3.
Figure 9:
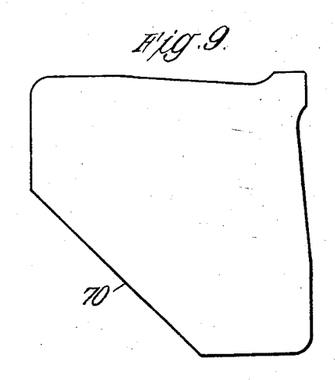
Figure 9 represents the profile of a cam for turning a tessel to the extent of 90°.
Figure 10:
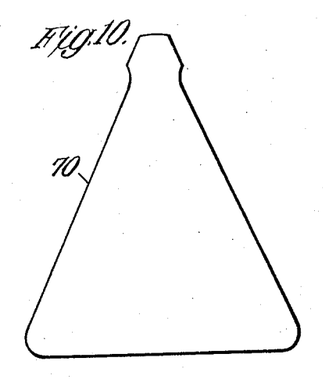
Figure 10 represents the profile of a cam for turning a tessel 45°.

A cam 70 is secured to the central spindle 58, for example by a screw 71 (Figure 5) so that the cam can be exchanged when it is desired to vary the extent of rotation of the tessel. The design of the cam depends upon the extent of rotation desired; examples are given in Figures 9 and 10. The spindle 58 comprises a squared portion 72 which engages a square hole in the steel plate 53, a boss 73 (Figures 3 and 5) being brazed or otherwise secured to the steel plate at this part to strengthen it, so that the disc 51 is rotated along with the spindle 58. The spindle passes through a bearing 74 having flat ends at the point of its engagement with the shell of the cylinder 42. A cam guide 80 and a reversing cam guide 81 are supported on a fixed shaft 82 in the turning cylinder 42, both these cam guides being rounded off at the leading edges as seen in Figures 7 and 8 respectively, that is, at the ends which the cam first engages in the rotation of the cylinder 42. It will be seen that when the turning cylinder revolves about its fixed shaft 82, each cam in passing along the guide 80 effects the turning of the disc 51 to the extent governed by the configuration of the cam, and on the continued revolution of the cylinder the guide 81 causes the cam to return to its previous position wherein the disc 51 is ready to receive the next tessel from the knife cylinder 33, and to repeat the turning movement.

Where feasible it is preferred that the tessels to be turned shall be transferred directly from the rotary cutting means to the plates or discs, and the turned tessels transferred directly from the plates or discs to the assembly surface, which latter may be a pin band drum as illustrated, or may be a travelling or reciprocating flat surface. Intermediate devices may, however, be employed, either to transfer the tessels from the rotary cutting means to the turning means, or to transfer them from the turning means to the assembly surface.

In the machinery usually employed, the rotary cutting means consist of rotary cylinders having knives secured on their peripheral parts; the pieces cut which are not required for the pattern are ejected from the pockets between the knives that have cut them and rejected, and those required for the pattern are subsequently ejected from the pockets between the knives that have cut them, on to the pins of the assembly surface, a knife cylinder and its associated devices being required for each variety of the elements in the pattern. With the present invention such a knife cylinder could directly inlay or deposit for assembly those of the tessels which were not to be turned, and in the case of some patterns such a knife cylinder and a set of turning devices would be needed for each variety of graining needed for the pattern. The present invention, however, in the case of some patterns renders a plurality of such knife cylinders or rotary cutting means unnecessary. For instance, where all the tessels of the pattern are to have the same kind of grain, but in the pattern some are to have it in the original direction and the others in another direction, as in Figure 22, they may all be cut from one sheet by the one cylinder, those tessels which are to be in the pattern with their grain unchanged can be inlaid or deposited for assembly directly from the knife cylinder or through an intermediate device, and the other tessels are ejected from the knives and transferred to the turning devices and turned and deposited on the assembly surface, through an intermediate transferring device if one be not employed between the cylinder and assembly surface. Again, with the present invention even when none of the tessels are to be assembled with their grain unchanged and the graining is to be changed in two directions or to two angles, patterns could be produced from one sheet of material with one knife cylinder by the use of two sets of turning devices co-operating therewith, one set effecting turning of certain of the tessels in one direction in which they are subsequently assembled or inlaid and the other set of devices turning the remaining tessels in another direction or to another degree after which they are assembled or inlaid. The two sets of turning devices would be located respectively to each side of the axis of the knife cylinder. With two sets of turning devices to the one knife cylinder, some tessels from the latter might be used in an unturned condition in the manner aforesaid, so that a pattern although cut from one sheet only may have three varieties of direction of graining, although in such a case intermediate transferring devices would be needed either in association with each set of turning devices or between the knife cylinder and the assembly surface. Further, different varieties of direction of graining may be obtained with the use of one set of turning devices by arranging some of the cams on the spindles or stems of the turning devices at different angles from others in the same set, by which means some of the turning devices would be turned to a greater degree than others.

Figure 11:
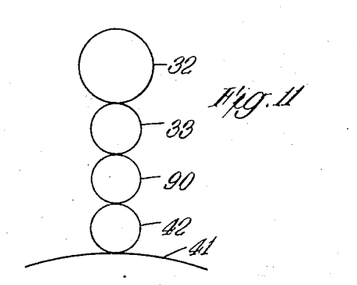
Figures 11 to 18 are diagrams representing modified arrangements of apparatus using one or more turning cylinders.
Figure 12:
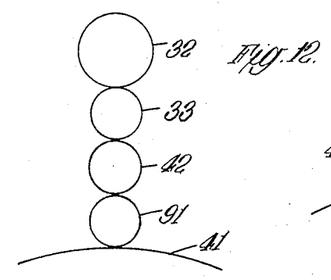
Figure 13:
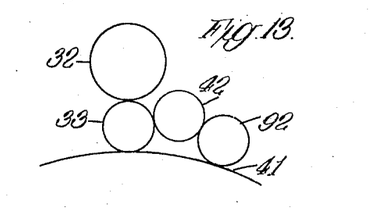
Figure 14:
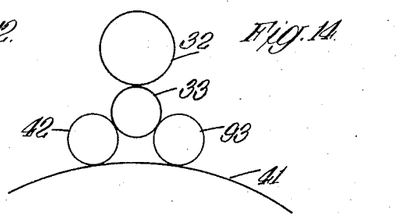
Figure 15:
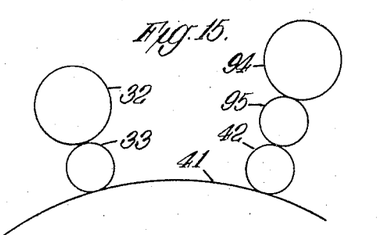
Figure 16:
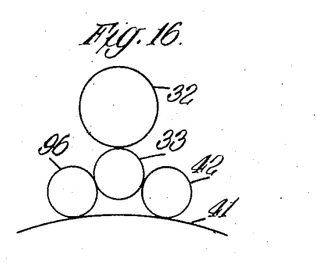
Figures 17, 18:
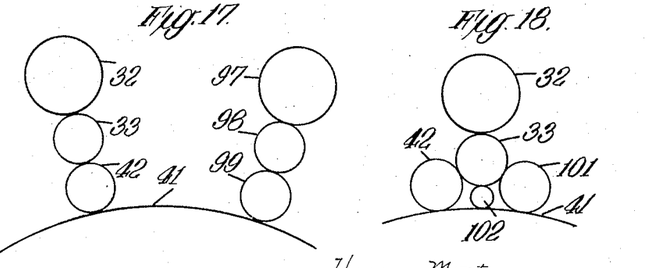

Instances of such arrangements are represented diagrammatically in Figure 11, where an intermediate cylinder 90 is placed between the knife cylinder and turning cylinder, and in Figure 12 where an intermediate cylinder 91 is placed between the turning cylinder 42 and the assembly surface 41. In Figure 13 the knife cylinder 33 is arranged to deliver some tessels directly to the assembly surface without being turned, while other tessels are taken from the knife cylinder by the turning cylinder 42 and passed by an intermediate cylinder 92 to the assembly surface 41. In Figure 14 there are two turning cylinders 42 and 93, each of which receives a selected series of tessels from the knife cylinder, and after these tessels have been turned to different degrees in the respective turning cylinders they are delivered to the assembly surface 41. In the arrangement represented in Figure 15 there are two cutting rolls 32 and 94, each associated with a knife cylinder, the two knife cylinders being indicated respectively by the numerals 33 and 95, the knife cylinder 33 delivering unturned tessels directly to the assembly surface 41, while the knife cylinder 95 delivers tessels to the cylinder 42, which after turning them places them on the assembly surface 41. Referring to Figure 16, the knife cylinder delivers selected tessels to the turning cylinder 42, and other selected tessels to the intermediate cylinder 96, which latter places unturned tessels on the assembly surface. In Figure 17 the arrangement illustrated in Figure 1 is duplicated, that is, there are two sets of cutting rolls (32, 97) knife cylinders (33, 98) and turning cylinders (42, 99) for delivering tessels turned to different degrees on to one assembly surface 41. In Figure 18 the tessels from a single knife cylinder 33 are distributed between two turning cylinders (42, 101) and one intermediate cylinder (102), the last three devices delivering tessels in three different positions relatively to the direction of travel on to an assembly surface 41. The devices receiving tessels must in all cases be moving, at the point where the transfer takes place, in the same direction and at the same speed as the devices from which the tessels are transferred. The moving devices are provided with means, for instance pins, to hold the tessels, and the respective sets of pins which penetrate the tessels at successive stages in their travel should relatively increase in effectiveness during the sequence of steps, so that pins intended to remove tessels may not be prevented from doing so by the action of the pins which are holding them prior to removal.

Figures 19, 20:
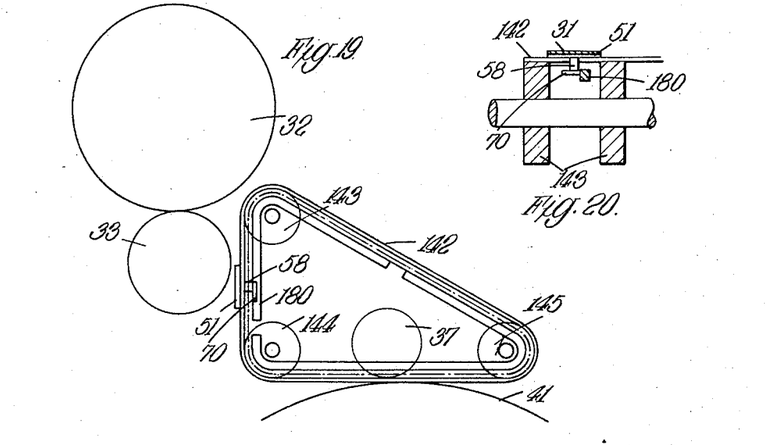
Figure 19 is a diagram representing an arrangement in which a belt is used for turning the tessels.
Figure 20 is a detail of the belt in cross section.
Figure 21:
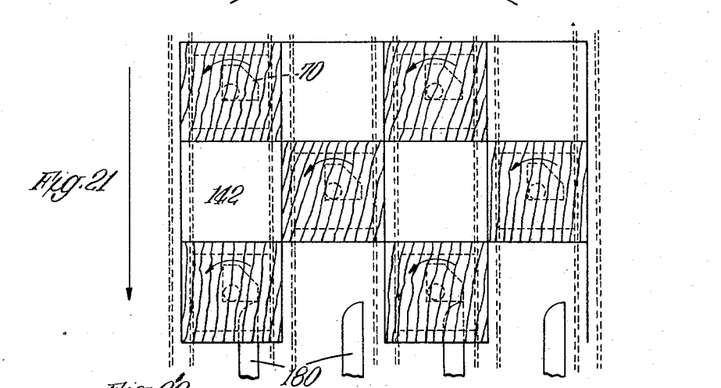
Figure 21 is a plan of the surface of the belt.

Instead of the turning devices being carried by a rotary cylinder, they may be carried by a travelling belt mounted on and driven by rollers or the like, and suitably geared in the machine. Figures 19 to 21 illustrate an example of such a modified arrangement. The belt 142 may be made substantially of rubber with metal bearings for the spindles 58 of the turning devices 51, or it may be made of metal links or elements jointed together, the spindle of each turning device being then conveniently mounted in one of the said metal links. The cams 70 co-operate with fixed cam guides 180. Where the turning devices receive the tessels to be turned while passing over one of the rollers or the like carrying the belt or move in a curved path at that part, or do so where the tessels are removed from the devices after turning, or both, suitable devices may be provided for causing the plates or disks to take a curved form at that part or those parts for the reasons explained. In the case of a belt, however, where the tessels to be turned are of such size that they cannot be disposed properly on the plates or discs or removed therefrom while the plates or discs are flat although moving in a curved path at those parts, it is preferred that the arrangement should be such that the turning devices receive the tessels to be turned and deliver them at parts of the path of the belt where it is in a substantially straight direction, and to mount the belt on three pairs of supporting or driving rollers 143, 144, 145 or the like to afford two conveniently disposed substantially straight portions in its path of movement. In this way the plates or discs may be used in the flat form. As the belt at these portions is not directly supported by its driving rollers or the like, additional rollers are provided at the reception and delivery parts of the path against which the inner side, or part of the inner side, of the belt may bear. Where, with such an arrangement, the turned tessels are to be transferred directly from the turning devices to an assembly surface which is flat or has a curve of large radius at that part, the additional roller must be disposed nearer to the surface than the periphery of that roller or the like over which the belt passes before it reaches the said additional roller, in order that the flat plates or discs with the turned tessels on them may be quite clear of the surface on which they are to be received before they reach the additional roller where they are forced onto the pins of the assembly surface. In such a case therefore the belt has a slightly angular instead of a strictly straight path of movement between the two supporting rollers or the like between which the removal of the pieces takes place. The stationary cam and guide surfaces in a belt arrangement are arranged to act similarly as in the cylinder arrangement so that each pair of such guide surfaces would extend along and within almost the whole of the path of the belt to co-act with cams 70 at the inner parts of the spindles or stems 58, and where the cam and guide surfaces are at those parts of the said path which pass partly around rollers or the like, sufficiently deep circumferential grooves are provided in the rollers or the like, to accommodate the portions of the cam and guide surfaces there located and to allow passage of the inner parts of the spindles or stems.

In all cases the tessels to be turned may be conveniently removed from the rotary cutting means onto the turning devices or intermediate device by ejecting means which act automatically to select and eject those particular tessels to be turned, and when the rotary cutting means consists of the usual knife cylinder, which is preferred, the selective ejecting means employed may be similar to those at present used in the method referred to for ejecting from the cylinder those cut pieces which are not to be used for the pattern.

It is preferable (although not necessary in some cases) that each plate or disc of the turning devices be as large as the tessel it is to receive, but the same devices may be used for smaller tessels when the distance between the plates or discs is correct for the pattern. The same set of turning devices might be suitable in different patterns in regard to disposition of the tessels they turn because different selections of the same turning devices might be used. Generally it would be convenient to arrange the turning devices of each set in staggered fashion in rows, as that disposition would be suitable for many marble or tile patterns and would also enable each plate or disc to be of maximum size compared to the distance between the rows. The plates or discs may, however, be arranged in the ordinary manner in circumferential rows, and this might enable them to be used for a greater variety of patterns, but their diameters or widths as compared to the distance between the rows would be less than in the staggered arrangement. A range of adaptability for various patterns may also be afforded in some cases by mounting the several turning devices in such a way that each or some of them may be readily removable from the cylinder or band carrying them, and providing a maximum of bearings in the cylinder or band, because by such means the relative positions of the several plates or discs could be changed, and the shape and size of the plates used could be changed, whereby their number could be varied, the fixed cam and guide surfaces or the like being suitably re-arranged or changed if necessary, but in some cases it might be feasible to provide a sufficient number of such surfaces arranged to provide surfaces for several changes. It has to be borne in mind that when tessels such as rectangular pieces to imitate herringbone parquetry are turned for the pattern as necessary, they occupy a different angular position on the assembly surface in comparison with their position as they are cut, so that when designing such a pattern and the cutting and turning means for it, regard must be paid to this consideration. It may be here remarked that it is not essential that the centres or middles of the cut tessels when on the turning devices coincide with the axes of the respective plates or discs carrying them, and the arrangement may be such that the centre of each turning device does not coincide with the centre or middle of the space between the knives from which the tessel is to be transferred, in which case the tessel to be turned would not be disposed symmetrically on the plate or disc of the turning device. In some cases this may be of use in designing for the production of a certain pattern.

Figure 24:
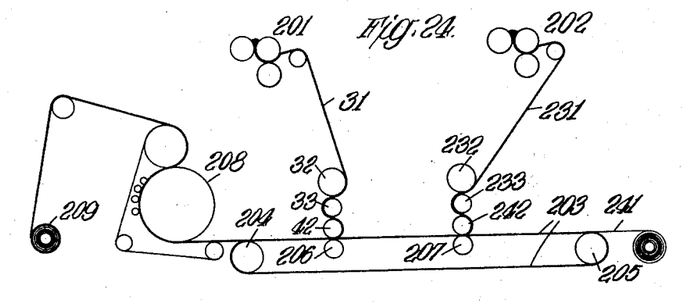
Figure 24 is a diagram illustrating the use of turning cylinders in a machine wherein the assembly surface travels on a flat bed.
Figure 25:
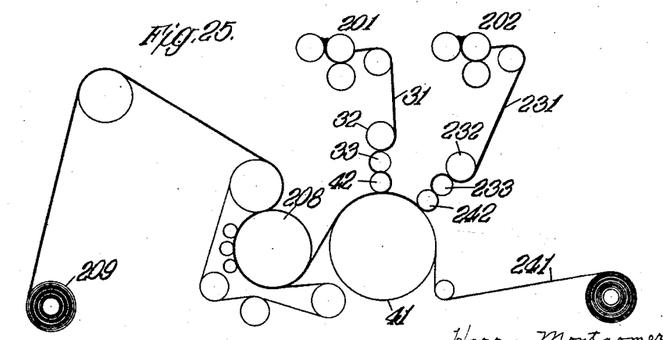
Figure 25 is a diagram illustrating the use of turning cylinders in a machine wherein the assembly surface is a cylindrical drum carrying the backing cloth in the known manner.

In the arrangement illustrated diagrammatically in Figure 24, two sets of calender rollers are indicated generally at 201 and 202, delivering sheets of material 31 and 231 to cutting rolls 32 and 232 associated with knife cylinders 33 and 233 and turning cylinders 42 and 242, the latter delivering tessels directly on to a backing cloth 241 which constitutes the assembly surface, and is carried by an endless supporting surface 203 passing around rotary carrying means 204, 205, and over supporting rollers 206, 207. The sheet of linoleum when the pattern thereof has been completed passes to the usual pressing machine 208 and is coiled in the usual manner into a roll 209.

By the present invention the continuity of the method may be preserved and by effecting the turning after the tessels to be turned have been removed from the rotary cutting means, those means can be substantially of the character heretofore usually employed and the turning devices may be of comparatively simple construction and action, also the invention may be readily embodied in existing machinery.

Figures 22, 23:
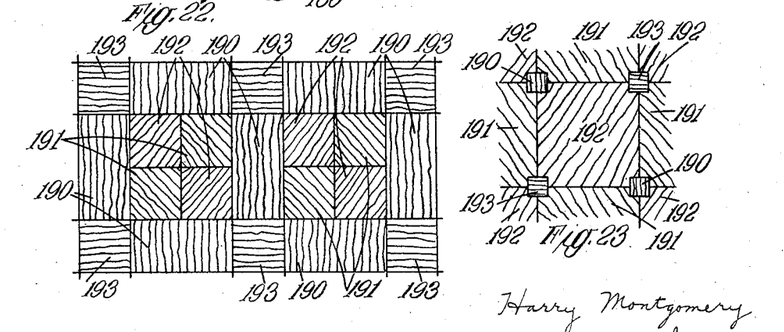
Figures 22 and 23 are examples of patterns which can be produced by the apparatus described.

In the patterns represented in Figures 22 and 23, the tessels indicated by the numeral 190 have not been turned, those indicated by 191 have been turned 45° to the left, those indicated by 192 have been turned 45° to the right, and those indicated by 193 have been turned 90°.

What I claim and desire to secure by Letters Patent of the United States is:—

1. The combination in an apparatus for the manufacture of inlaid floorcloths; of a rotary knife cylinder; a platen; means to supply a sheet of plastic material to said knife cylinder and platen to be cut into pattern elements; a movable member having an assembly surface to receive said pattern elements; separate means interposed between said knife cylinder and said assembly surface to receive and turn certain of said pattern elements and dispose them on said assembly surface in their turned positions and correct situations as components of the pattern.

2. The combination in an apparatus for the manufacture of inlaid floorcloths, said apparatus being of the kind to which sheets of plastic material are fed and pattern elements are cut from said sheets, of rotary cutting means; a movable member having an assembly surface; and a plurality of turning devices arranged to travel at the same surface speed as said cutting means, each of said devices being adapted to receive a cut pattern element from said cutting means, to turn while holding said pattern element, and to forward said element to said assembly surface.

3. Apparatus as in claim 2 wherein an intermediate cylinder is interposed between the cutting means and the turning devices.

4. Apparatus as in claim 2 wherein an intermediate cylinder is interposed between the turning devices and the assembly surface.

5. The combination in an apparatus for the manufacture of inlaid floorcloths, said apparatus being of the kind to which sheets of plastic material are fed and pattern elements are cut from said sheets, of rotary cutting means; a movable member having an assembly surface; a turning cylinder interposed between said cutting means and said assembly surface, said turning cylinder being provided with a number of plates adapted to take pattern elements from said cutting means; means to impart to each of said plates a movement of rotation; means to control the extent of said rotation; means to transfer said pattern elements from said plates to said assembly surface.

6. The combination in an apparatus for the manufacture of inlaid floorcloths, said apparatus being of the kind to which sheets of plastic material are fed and pattern elements are cut from said sheets, of rotary cutting means; a plurality of turning devices each comprising a plate to receive a pattern element from said cutting means, a spindle on which each plate is mounted, and means for rotating the spindle to turn said pattern element; a moving assembly surface; and means to take said pattern element when thus turned from said plate to dispose said pattern element on any suitable moving assembly surface.

7. The combination in an apparatus for the manufacture of inlaid floorcloths, said apparatus being of the kind to which sheets of plastic material are fed and pattern elements are cut from said sheets, of rotary cutting means; turning devices adapted to receive pattern elements from said cutting means, and carried in a moving member adjacent said cutting means; cams associated with said turning devices on said moving member; fixed guides arranged to co-operate with said cams to effect the turning movements of said devices; and means to remove said pattern elements from said devices when thus turned and to dispose said pattern elements on any suitable moving assembly surface.

8. The combination in an apparatus for the manufacture of inlaid floorcloths, said apparatus being of the kind to which sheets of plastic material are fed and pattern elements are cut from said sheets, of rotary cutting means; a cylinder adjacent said cutting means and carrying plates to receive cut pattern elements from said cutting means, each of said plates being mounted on a spindle associated with a cam, said cylinder being rotatable about fixed cam guides which co-operate with the cams associated with the spindles of said plates to turn said plates and thereby to turn the pattern elements on said plates; and means to remove said pattern elements from said plates when thus turned and to dispose said pattern elements on any suitable moving assembly surface.

9. The combination in an apparatus for the manufacture of inlaid floorcloths, said apparatus being of the kind to which sheets of plastic material are fed and pattern elements are cut from said sheets, of rotary cutting means; an endless travelling belt adjacent said cutting means and carrying plates to receive cut pattern elements from said cutting means, each of said plates being mounted on a spindle associated with a cam, said belt being adapted to travel adjacent fixed cam guides which co-operate with the cams associated with the spindles of said plates to turn said plates and thereby to turn the pattern elements on said plates; and means to remove said pattern elements from said plates when thus turned and to dispose said pattern elements on any suitable moving assembly surface.

10. In apparatus for the manufacture of inlaid floorcloths, said apparatus being of the kind to which sheets of plastic material are fed and pattern elements are cut from said sheets, rotary cutting means, a movable member having an assembly surface, a plurality of flexible turning devices, each of said devices being rotatably mounted and operable to receive a pattern element from said rotary cutting means and to turn and dispose said element on said assembly surface.

HARRY MONTGOMERY.